United States Patent [19]
Lemons

[11] Patent Number: 4,567,689
[45] Date of Patent: Feb. 4, 1986

[54] VINEYARD CULTIVATOR

[76] Inventor: Daniel P. Lemons, 1021 Tanya St., Paso Robles, Calif. 93446

[21] Appl. No.: 567,419

[22] Filed: Dec. 30, 1983

[51] Int. Cl.⁴ ............................ A01B 39/16; A01B 39/26
[52] U.S. Cl. ............................................ 47/1.7; 172/6; 172/310; 172/311; 172/711
[58] Field of Search ............... 47/1.7, 1; 172/5, 38, 172/311, 315, 316, 491, 233, 657, 705, 709, 711, 748, 6, 98, 310, 311, 649, 651, 776, 709; 280/656

[56] References Cited

U.S. PATENT DOCUMENTS

| | | | |
|---|---|---|---|
| 1,091,831 | 3/1914 | Gibbons | 172/711 |
| 1,276,531 | 8/1918 | Howard et al. | 172/648 |
| 1,928,952 | 10/1933 | Silver | 172/315 |
| 2,185,034 | 1/1940 | Jacobs et al. | 172/233 |
| 2,434,730 | 1/1948 | Woock | 172/233 X |
| 2,559,002 | 7/1951 | Brock | 172/605 |
| 2,664,039 | 12/1953 | Heckathorn | 172/328 |
| 2,756,654 | 7/1956 | Porterfield et al. | 172/98 X |
| 2,805,612 | 9/1957 | Beard | 172/491 X |
| 2,958,383 | 11/1960 | Danielson | 172/311 X |
| 3,012,371 | 12/1961 | Pawela | 47/1.7 |
| 3,117,632 | 1/1964 | Caggiano | 172/5 |
| 3,183,978 | 5/1965 | Alzani et al. | 172/38 |
| 3,266,579 | 8/1966 | Hofer | 172/748 |
| 3,330,574 | 7/1967 | Kulyk | 280/656 |
| 3,601,201 | 8/1971 | Schmitz | 172/705 X |
| 3,637,027 | 1/1972 | Kovar | 172/311 |
| 3,669,195 | 6/1972 | Green et al. | 172/311 |
| 3,841,413 | 10/1974 | Applewhite | 172/311 |
| 3,955,626 | 5/1976 | Taylor | 172/6 |
| 4,036,306 | 7/1977 | Kinzenbaw | 172/287 |
| 4,206,569 | 6/1980 | Randolph | 47/1.7 |
| 4,291,492 | 9/1981 | Reynolds et al. | 47/1.7 X |
| 4,384,618 | 5/1983 | Williams | 172/38 X |

FOREIGN PATENT DOCUMENTS

| | | | |
|---|---|---|---|
| 161784 | 5/1954 | Australia | 172/705 |
| 163991 | 7/1954 | Australia | 172/5 |
| 2735902 | 12/1978 | Fed. Rep. of Germany | 172/709 |
| 2900716 | 7/1979 | Fed. Rep. of Germany | 172/705 |
| 2925532 | 1/1981 | Fed. Rep. of Germany | 172/311 |
| 1097099 | 6/1955 | France | 172/5 |
| 1408887 | 7/1965 | France | 172/5 |
| 1503803 | 10/1967 | France | 172/776 |
| 2303455 | 11/1976 | France | 172/233 |
| 584445 | 10/1958 | Italy | 172/98 |
| 138096 | 10/1960 | U.S.S.R. | 47/1.7 |
| 190113 | 1/1967 | U.S.S.R. | 172/6 |
| 190682 | 2/1967 | U.S.S.R. | 172/5 |
| 276617 | 10/1970 | U.S.S.R. | 47/1.7 |
| 442761 | 5/1975 | U.S.S.R. | 172/311 |
| 490416 | 2/1976 | U.S.S.R. | 172/38 |
| 662031 | 5/1979 | U.S.S.R. | 172/5 |
| 762767 | 9/1980 | U.S.S.R. | 172/748 |
| 961576 | 9/1982 | U.S.S.R. | 172/311 |

Primary Examiner—James R. Feyrer
Attorney, Agent, or Firm—Daniel C. McKown

[57] ABSTRACT

A cultivator particularly well adapted for use in vineyards and orchards because of its ability to cultivate the ground between successive plants in the same row includes a main frame that is continuously laterally expandable under control of the operator to accommodate variations in the spacing between rows; outriggers that flank the main frame and that contract laterally when collision with an object in their path becomes imminent; a spot sprayer mounted on each outrigger and activated by the lateral contraction and expansion of the outrigger to direct a spray of herbicide or other chemicals at the base of each plant but no where else; and a cultivator shank assembly that is castered-mounted to the outrigger or to the main frame so as to pivot to assume the direction of motion of the outrigger or main frame to which it is mounted.

23 Claims, 22 Drawing Figures

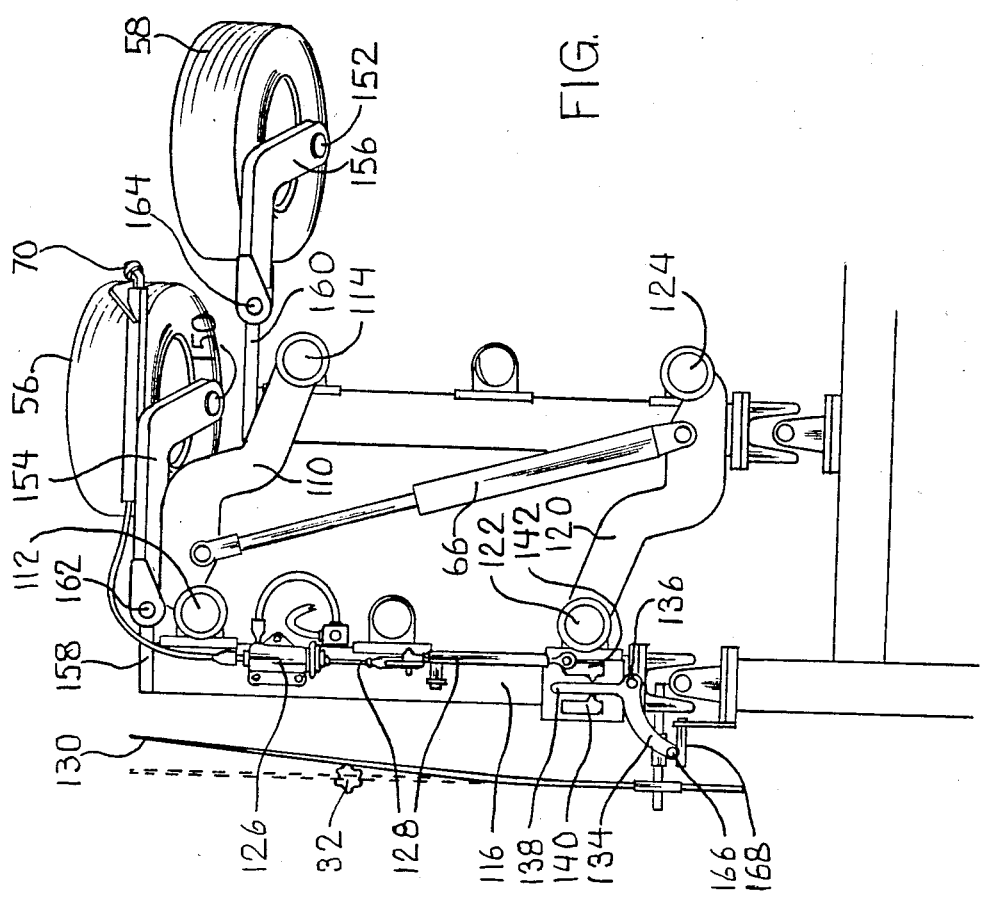

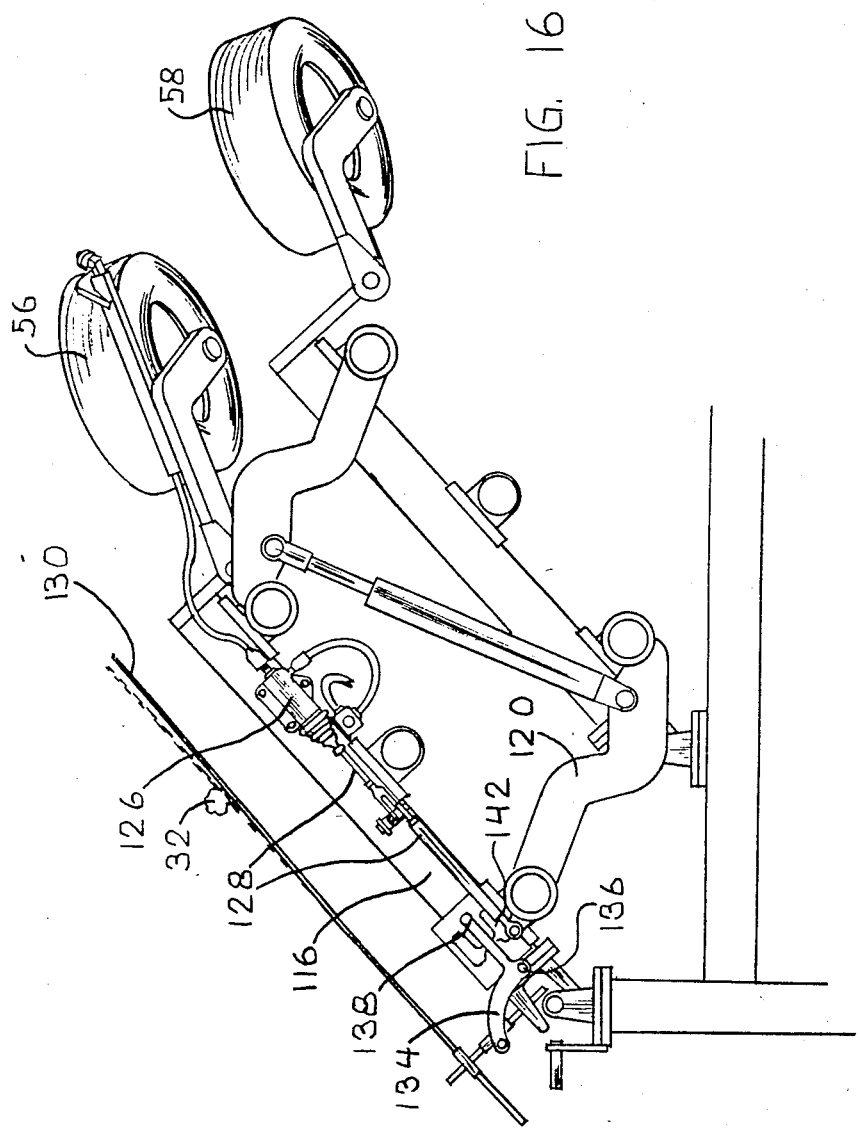

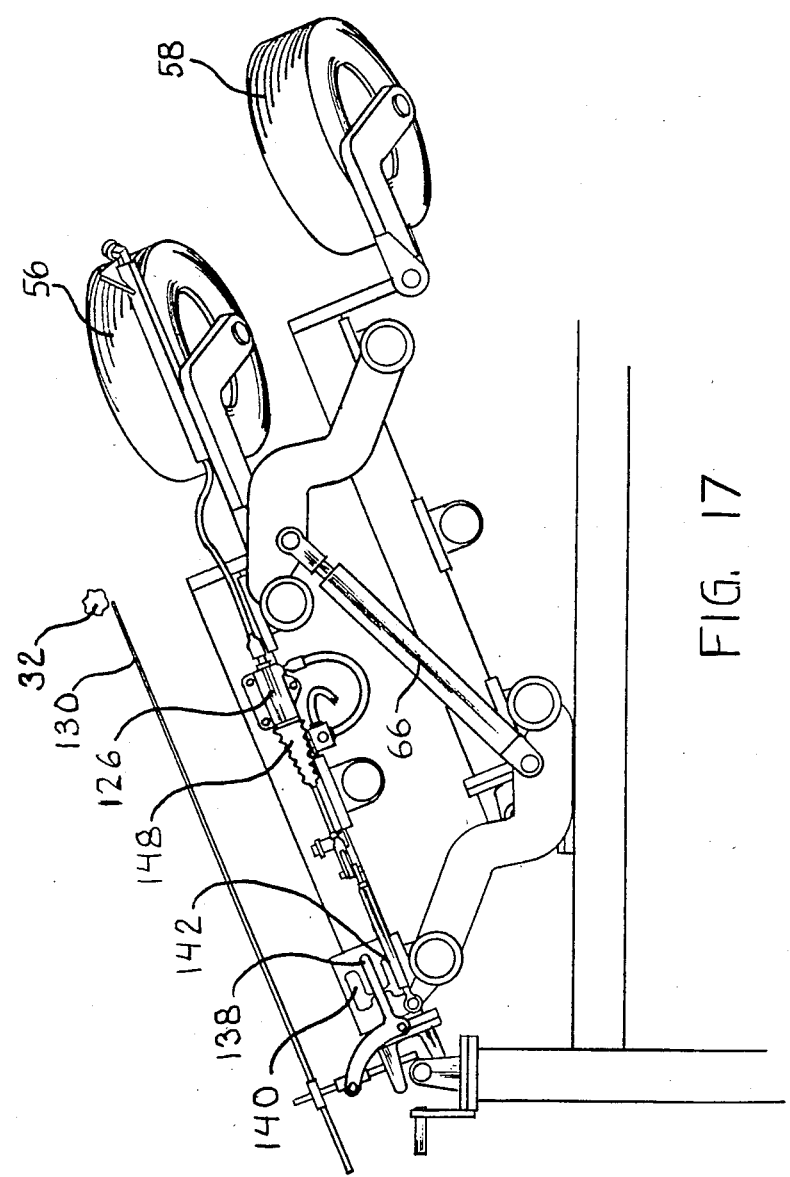

VINEYARD CULTIVATOR

BACKGROUND OF THE INVENTION

Field of the Invention

The present invention is in the field of agricultural implements and more particularly relates to a cultivator that is especially well adapted for use in orchards and vineyards.

Background

Orchards and vineyards are generally planted in rows. The spacing between the rows would ideally be constant, but in practice variations of 20 percent or 30 percent in row width are not unusual.

The soil between the rows of trunks and around the trunks needs to be cultivated. Two major problems make this task difficult when conventional equipment is used. First, is the varying width of the space between the rows. Second, it is difficult to get the equipment close enough to the trunks without running into and damaging the trunks. Typically, this has made it necessary to run the tractor six times over the field and even then to bring in workers with hand tools to cultivate at the bases of the trunks.

Finally, it has been conventional practice to spray the entire area between the plants to keep the weeds under control. However, it is mainly the weeds that are closest to the trunks that need to be controlled. Spraying the entire field introduces a large amount of herbicide into the soil which may eventually render the soil unusable, particularly when sterilant-type sprays are used. Ideally, only the weeds near the base of each trunk would be sprayed; and, if the spray is delivered accurately, a contact-type of herbicide could be used that will not accumulate in the soil.

Several cultivators for use in vineyards and orchards are presently being marketed. It is not known when these cultivators were invented, and they are not admitted to be prior art to the present invention. Once the present invention is fully understood, it will be seen that the present invention can be distinguished from these other cultivators that are currently being marketed.

The first of these cultivators is known as the CULTIMATIC HUMIS which is described in a pamphlet distributed by Tradewinds, Inc. of Tacoma, Wash. In the pamphlet the CULTIMATIC is said to be manufactured in France under a German patent, and is said to have been in service for more than ten years.

The CULTIMATIC consists of wheeled frame to which is attached a laterally extending arm on which two laterally spaced rotating cultivator heads are mounted. A contact arm is also mounted to the laterally extending arm and when it encounters an object, it causes the rotary cultivators to shift laterally a distance of 35 centimeters. The rotary cultivators are moved by a chain drive mechanism.

A second cultivator that is now on the market is shown in an advertisement on page 40 of the "California Grape Grower" for September 1983. The advertisement carries the name A. Spedo & Figli. The advertisement shows a wheeled frame that is pulled by a tractor and includes an arm that extends laterally beyond the wheel. At the end of the arm is mounted a number of disks on an axle. A contact arm is provided, and the axle on which the disks are mounted appears to pivot rearward about a vertical axis. The device appears to be hydraulically operated.

A third cultivator presently on the market is sold under the name or trademark WEED BADGER and is manufactured by the Weed Badger Division of Town and Country Research and Development, Inc., of Litchville, N. Dak. The WEED BADGER is hydraulically operated and includes a single rotary cultivator that is mounted at the end of a laterally extending arm. The laterally extending arm is hinged about a longitudinal axis to an intermediate member which in turn is hinged about a second longitudinal axis to the tractor. The second longitudinal axis is vertically above the first longitudinal axis, and as the intermediate member pivots about the second longitudinal axis, the arm is extended or retracted laterally. The amount of retraction is said to be 40 centimeters.

A fourth cultivator presently being marketed is known as the KIMCO TILLER Model 8200, manufactured by Kimco Manufacturing Inc. of Fresno, Calif. This cultivator includes a laterally extending trip rod that activates the cultivator. The cultivator includes a rotary cultivating head mounted at the end of an arm which pivots rearwardly about a vertical axis.

As will be shown below, the present invention differs in many important respects from the cultivators that are presently on the market.

The Prior Art

Several patents show implements that have main frames or central portions that can be altered in width. These patents include U.S. Pat. No. 1,276,531 issued Aug. 20, 1918 to Howard, et al.; U.S. Pat. No. 3,841,413 issued Oct. 15, 1974 to Applewhite; U.S. Pat. No. 2,664,039 issued Dec. 29, 1953 to Heckathorn; and, U.S. Pat. No. 2,559,002 issued July 3, 1951 to Brock. In the implements described in these patents, it does not appear that the width can be altered while the implement is working.

In U.S. Pat. No. 4,036,306 issued July 19, 1977 to Kinzenbaw, there is described an adjustable plow, the width of which can be adjusted by an operator while the plow is working. The structure of this adjustable plow is very different from that of the present invention.

In U.S. Pat. No. 3,955,626 issued May 11, 1976, Taylor shows a multi-row vineyard cultivator that includes an outrigger cultivating unit on either side. The central portion of the cultivator is controlled to move along a first row of grapevines, straddling them. The outriggers straddle rows on either side of the first row. The outriggers are laterally movable to accommodate variations in the spacing between the rows. Only the soil near the rows of vines is cultivated, but most of the soil between the rows remains uncultivated. The outriggers of Kinzenbaw do not swing back to avoid the plants as do the outriggers of the present invention.

In U.S. Pat. No. 4,206,569 issued June 10, 1980, Randolph describes a spot sprayer that uses microswitches to activate the spray nozzles.

Earth-working implements that fold up for transportation or storage are shown in U.S. Pat. No. 3,637,027 issued Jan. 25, 1972 to Kovar and in U.S. Pat. No. 3,669,195 issued June 13, 1972 to Green, et al. In contrast, in the cultivator of the present invention the outriggers hinge up and down to accommodate variations in the slope of the land.

Thus, the structure and the mode of operation of the present invention does not appear to be known in the prior art, nor have its advantages yet been fully appreciated.

SUMMARY OF THE INVENTION

The present invention is an improved cultivator, including a spot sprayer, for use in an orchard or a vineyard. The cultivator is controllable in width while in operation to accommodate the variations in the row width. Further, the cultivator of the present invention is designed to avoid bumping into and thereby injuring the trunks. Finally, the cultivator of the present invention includes a spot sprayer that automatically and accurately sprays the soil surrounding the trunk of each tree or vine.

The cultivator of the present invention is a wheeled vehicle designed to be towed by a tractor. The major components of the cultivator are the main frame and two outriggers which are attached to opposite sides of the main frame. In a preferred embodiment the main frame is expandable laterally while in operation, under control of the tractor operator.

Each outrigger independently has the ability automatically to pivot rearwardly and inwardly from a normal position perpendicular to the longitudinal axis of the main frame to a retracted position adjacent the side of the main frame to avoid running into the trunks. The lateral expansion of the main frame and the pivoting motion of the outriggers are powered hydraulically by a hydraulic pump that is driven by the tractor's power take-off.

Each outrigger is normally locked in a position perpendicular to the longitudinal axis of the cultivator. As one of the outriggers approaches the trunk of a tree or vine, a contact bar mounted on the outrigger makes a light contact with the trunk. The resulting slight movement of the contact bar trips a first microswitch that opens a first hydraulic valve thereby activating a hydraulic piston that causes the outrigger to retract to avoid a damaging collision with the trunk.

After the trunk has been avoided and the contact bar is no longer deflected by the trunk, the contact bar is deflected in the opposite direction by a spring that connects it to the frame of the outrigger. When thus deflected in the opposite direction, the contact bar trips a second microswitch that opens a second hydraulic valve thereby causing the hydraulic piston to return the outrigger to its initial position.

This mode of operation of the outriggers permits the soil between successive trunks in the same row to be cultivated without damaging the trunks and without changing speed or taking evasive maneuvers.

If the shanks of the sweeps that tear up the ground were rigidly attached to the outriggers, the direction of the sweep would be altered as the outrigger pivots. This would be a serious problem because strong lateral forces would be exerted on the cultivator causing it to veer erratically. To avoid this problem, the sweeps are caster-mounted to the outrigger to permit the sweeps to follow the trajectory of the shanks as the outrigger simultaneously moves forward and pivots.

In the preferred embodiment, lateral expansion of the main frame is accomplished by hydraulically operated telescoping members. A laterally-unmoving portion of the main frame is connected to the tractor and includes wheels for supporing the cultivator. The left outrigger is mounted on the left side of the laterally-unmoving portion of the main frame, while the right outrigger is mounted to the laterally-movable portion of the main frame at the right side of the main frame. The sweeps of the laterally-movable portion of the main frame are castered, but the sweeps of the laterally-unmoving portion of the main frame are intentionally rigidly attached to it to enhance directional stability.

When the contact bar on one of the outriggers makes contact with the trunk of a tree or vine, a directed spray of herbicide is released from a nozzle that is mounted in an appropriate position on the outrigger. The nozzle is positioned to direct the spray at the ground around the trunk of the vine.

In one embodiment of the invention, the motion of the outrigger as it retracts pressurizes the herbicide.

In addition to being pivoted to retract laterally as described above, the outriggers are mounted to the main frame in such a manner as to be able to pivot up and down about a longitudinal hinge axis to accommodate lateral variations in the slope of the land. In a preferred embodiment, the outriggers are mounted to the main frame by universal joints; in an alternative embodiment, ball joints are used.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 15 is a top view of the right outrigger of the cultivator of FIG. 1 shown an instant after the sensing arm has made contact with a tree, vine, stack, or other object, the drawings of FIGS. 15-20 inclusive constituting a sequence showing the operation of the outrigger and sprayer as the outrigger maneuvers around an object in its path;

FIG. 16 shows the outrigger of FIG. 15 at a slightly later time;

FIG. 17 shows the configuration of the outrigger at a later time than in FIG. 16;

DETAILED DESCRIPTION OF THE PREFERRED EMBODIMENT

Figure 1:
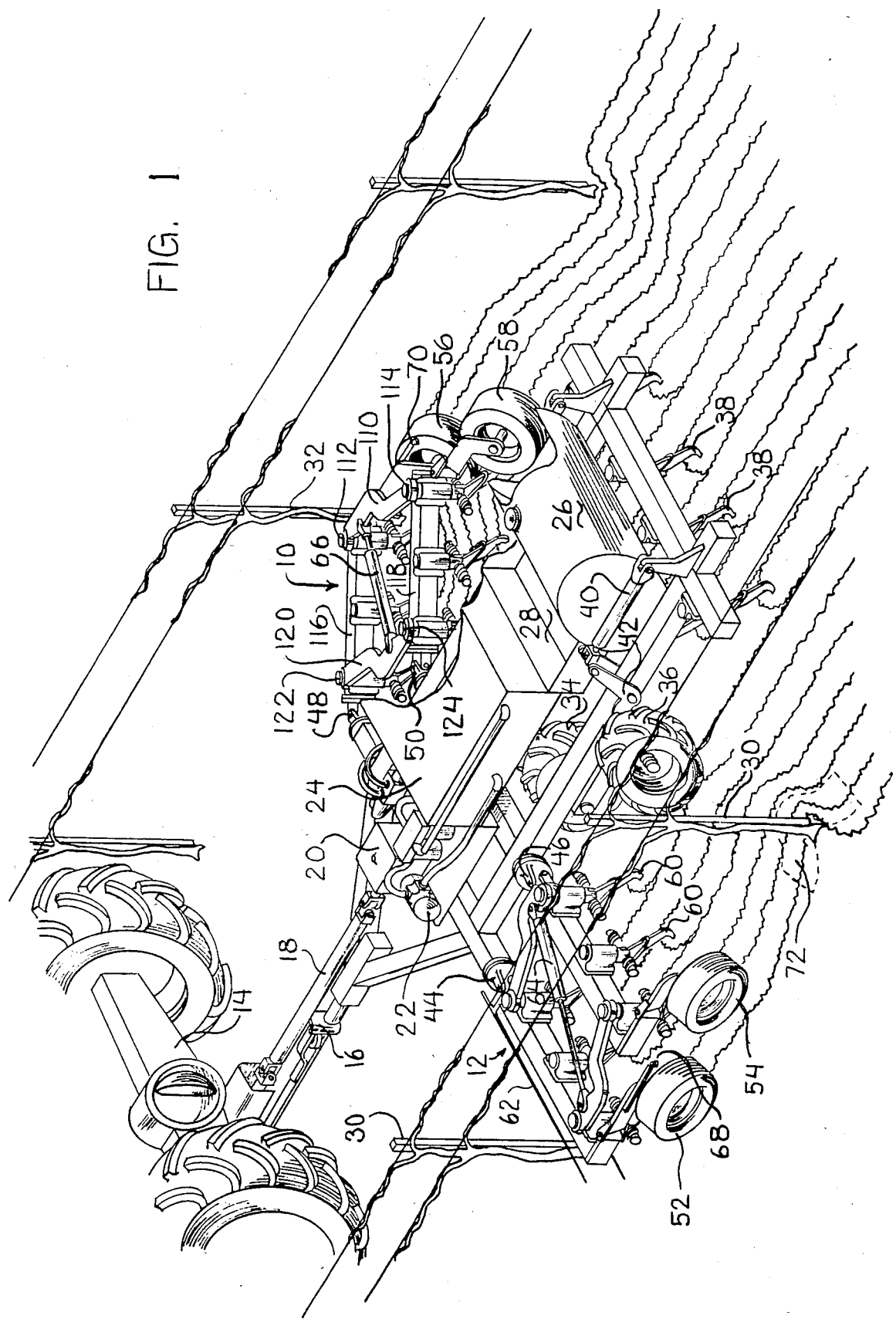
FIG. 1 is a perspective view showing the cultivator of the present invention in use.

In a preferred embodiment, the cultivator of the present invention includes a laterally-expandable and centrally located main frame flanked on its sides by a right outrigger 10 and a left outrigger 12.

In one alternative embodiment, the central main frame lacks the capability of expanding laterally. In another embodiment, the right outrigger 10 or the left outrigger 12 is omitted. In still other embodiments, a right or left outrigger is combined with a central main frame that lacks the capability of expanding laterally. Throughout the present discussion and in the drawings, unless otherwise indicated, the preferred embodiment will be described.

As shown in FIG. 1, the cultivator of the present invention is attached to a tractor 14 by means of an adjustable pull hitch 16, and power to operate the hydraulic system of the cultivator is coupled to the cultivator from the tractor's power take-off by the driveshaft 18.

The driveshaft 18 is connected to the gear box 20 for driving the hydraulic pump 22. A hydraulic oil reservoir 24 is provided on top of the cultivator, and it serves also to promote cooling of the hydraulic fluid. The hydraulic system of the cultivator will be described in greater detail below in connection with FIG. 22.

Also carried onboard the main frame is a herbicide tank 26 and a tool box 28.

As shown in FIG. 1, the left outrigger 12 is in what will be called the extended position, that is, fully extended away from the main frame so as to reach in between the stakes 30.

In contrast, the right outrigger 10 is shown in what will be referred to as the retracted position, that is, fully drawn in toward the main frame so as to avoid hitting the stake 32.

The wheels 34, 36 are used for transporting the cultivator as well as for supporting the central main frame. The wheels 34, 36 are always in contact with the surface of the ground.

The hydraulic cylinder 40 is connected through a crank 42 to the axle assembly of the wheels 34, 36. Activation of the hydraulic cylinder 40 permits the main frame of the cultivator to be raised with respect to the axles of the wheels 34, 36 so that during transportation of the cultivator, the cultivating shanks 38 do not contact the ground.

Activation of the hydraulic cylinder in the opposite direction lowers the central main frame with respect to the axles of the wheels 34, 36 so as to lower the cultivating shanks 38 to the ground for operation.

Also visible in FIG. 1 are the universal joints 44, 46, 48, 50 by means of which the outriggers are connected to the main frame of the cultivator. It should be noted that the rear universal joints 46, 50 are located inward toward the center of the main frame compared with the forward universal joints 44, 48. The purpose of this staggering of the universal joints is to permit the outrigger to swing back closer to the main frame than would be possible if the universal joints were located at the same lateral station. That is, the staggering of the universal joints permits a greater amplitude for the swinging motion of the outriggers.

The wheels 52, 54, 56, 58 on the outriggers support the outriggers and control the depth of the swivel shanks 60 that are mounted on the outriggers.

It should also be noted that the wheels 52, 54, 56, 58 are cambered; that is, the wheels on opposite sides of the main frame are closer together at their bottoms than at their tops. The inventor discovered that the cambered alignment of the wheels is very helpful in keeping the wheels rotating instead of dragging during certain phases of the maneuver by which the outrigger avoids hitting an object in its path.

Also visible in FIG. 1 is the sensing arm 62 of the left outrigger 12. The sensing arm is yieldably mounted to the outrigger, and pivots rearwardly relative to the outrigger when it encounters an object in the path of the outrigger. The various motions of the sensing arm relative to the outrigger result in the tripping of certain microswitches that control the flow of hydraulic fluid to the hydraulic cylinders 64, 66 that drive the outrigger to pivot to and from its retracted position.

As can be seen in FIG. 1, and also in FIGS. 2, 4, and 15-20, the frame of the outrigger generally has the shape of a parallelogram in which the hydraulic cylinders 64, 66 interconnect opposite sides of the parallelogram and lie in a generally diagonal position within their respective parallelograms.

An important feature of the present invention are the spray nozzles 68, 70 of the left and right outriggers respectively. These spray nozzles are mechanically actuated to emit a spray of herbicide or other liquid during a portion of the outrigger's maneuver so that an area 72 in the immediate vicinity of the foot of the stake 30 is sprayed as the cultivator moves past it.

The various systems and assemblies identified in the above discussion in connection with FIG. 1 will be described in greater detail below. Wherever possible, the same reference numerals will be used to identify corresponding parts.

Figure 2:
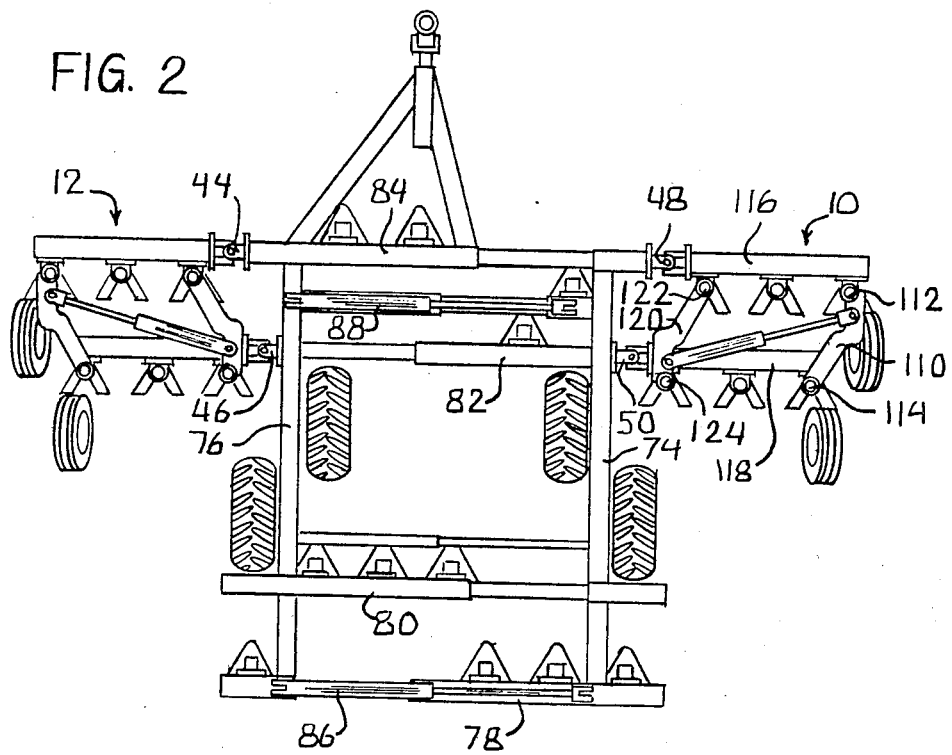
FIG. 2 is a top view showing the cultivator with the main frame portion expanded.
Figure 4:
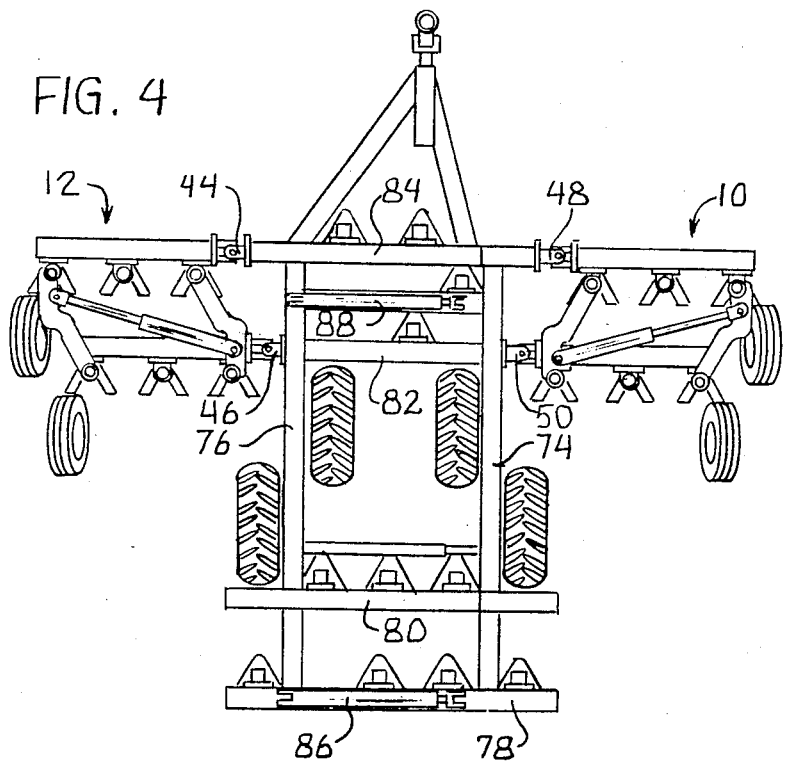
FIG. 4 is a top view showing the main frame of the cultivator in a contracted configuration.

FIGS. 2 and 4 are top views of the cultivator showing the main frame in its laterally-extended and contracted configurations respectively. The ability to expand or contract the main frame is particularly useful where the spacing between rows of plants or trees varies appreciably. The left and right outriggers 12, 10 enable the cultivator to cultivate between successive plants in the same row.

As shown in FIGS. 2 and 4, the main frame includes the longitudinal members 74, 76 and the telescoping lateral members 78, 80, 82, 84.

Lateral expansion and retraction of the main frame is brought about by the hydraulic cylinders 86, 88, which are controlled by the operator of the cultivator. The operator controls expansion and retraction of the main frame by the use of electrical switches mounted on the tractor. These switches are connected to solenoid valves on the main frame, which control the flow of hydraulic fluid to the cylinders 86, 88.

Figure 3:
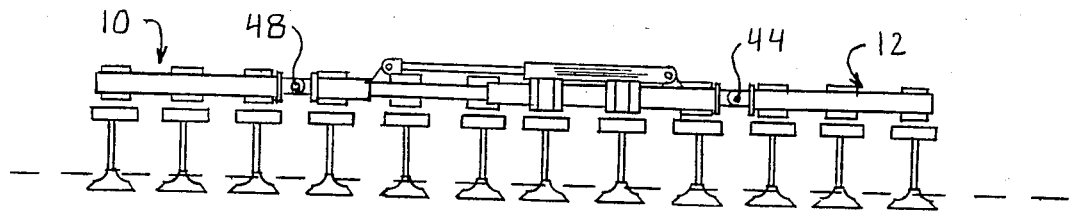
FIG. 3 is a front view of the cultivator configuration of FIG. 2.
Figure 5:
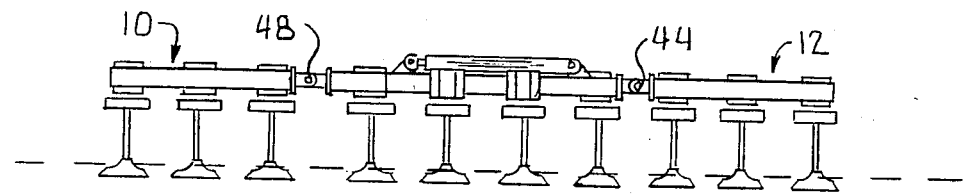
FIG. 5 is a front view showing the retracted configuration of FIG. 4.

FIGS. 3 and 5 are front views of the cultivator as shown in FIGS. 2 and 4 respectively.

Figure 6:
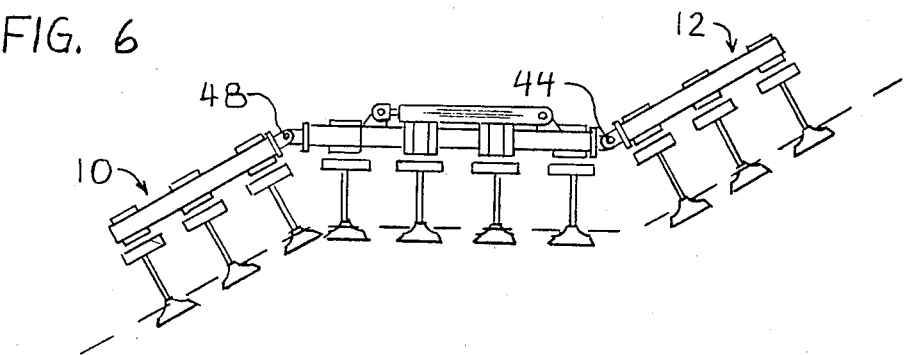
FIG. 6 is a front view similar to FIG. 5, but showing how the hinged outriggers permit the cultivation of irregular soil contours.

FIG. 6 shows how the universal joints 44, 48 permit the outriggers 10, 12 to pivot up and down to accommodate variations in the terrain. In the example shown in FIG. 6, the main frame is moving along a terraced ledge from which the earth slopes laterally upward on the left side and laterally downward on the right side, as seen from the cultivator. As seen in FIGS. 2 and 4, in the preferred embodiment, on each of the outriggers 10, 12 there are mounted six cultivator sweeps, and eleven cultivator sweeps are mounted on the main frame. As can be appreciated, if these cultivator sweeps, most of which are subjected to sideward movement, were of conventional design, then enormous forces would be generated during the lateral movement tending to sheer off the cultivator shanks. To make the cultivator practical, it was necessary for the present inventor to originate an improved type of cultivator shank for use where sideward motion is imposed. Such a cultivator shank is shown in greater detail in FIGS. 7–10, which will now be discussed.

Figure 10:
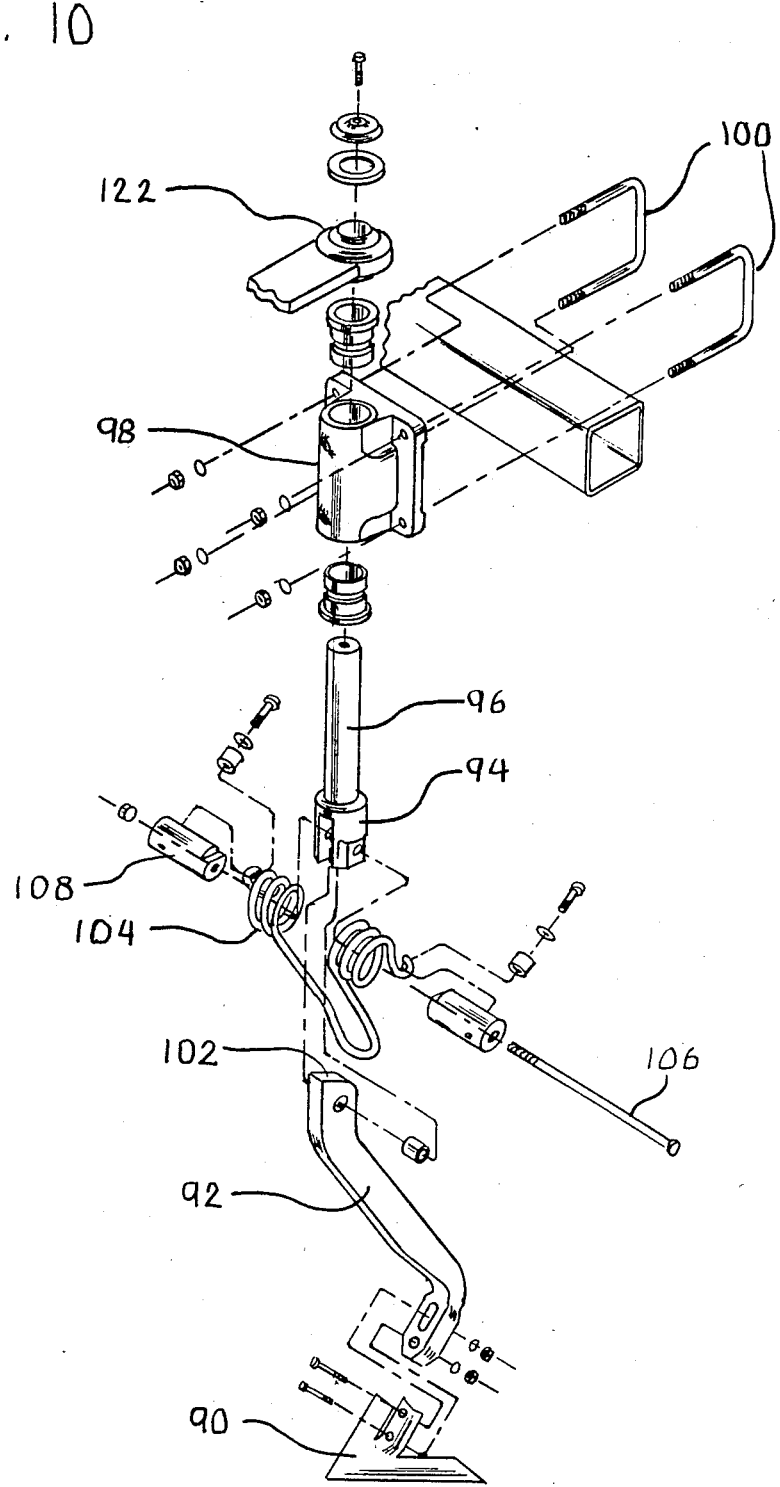
FIG. 10 is an exploded perspective view of the castered cultivator sweep of FIG. 7.

As perhaps best seen in FIG. 10, and reading from the bottom up, the cultivator shank assembly includes a cultivator sweep 90 that is bolted to the lower end of the cultivator shank proper 92. When in use, most of the cultivator sweep 90 is below ground level. The upper end of the cultivator shank 92 is mounted in a clevis 94 to permit the cultivator shank 92 to pivot about a horizontal axis. The clevis 94 terminates at its upper end in a shaft 96 which is mounted for rotation about a vertical axis in the bushing block 98. The bushing block 98 is rigidly mounted to frame of the cultivator through the use of the U-bolts 100.

Figure 8:
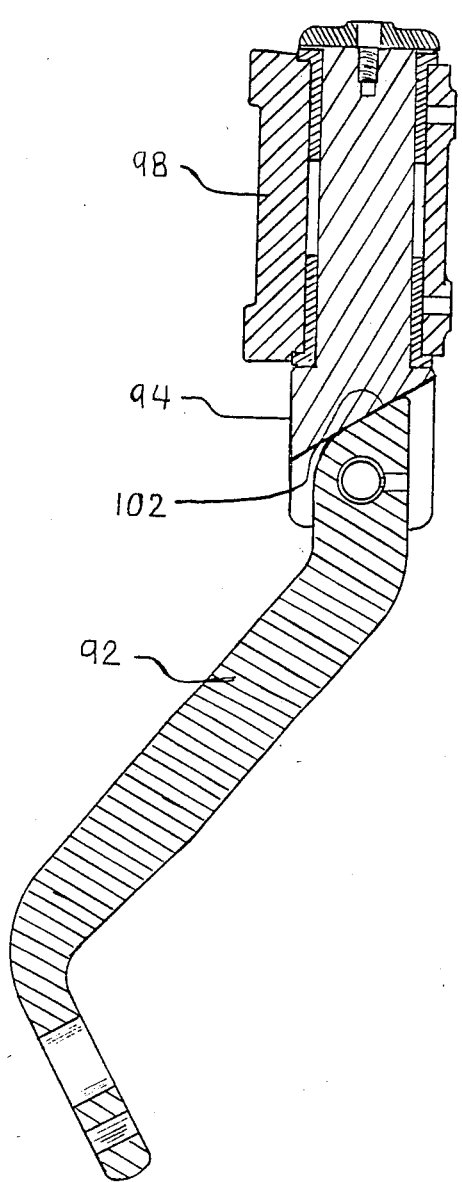
FIG. 8 is a side view of the cultivator sweep of FIG. 7.
Figure 9:
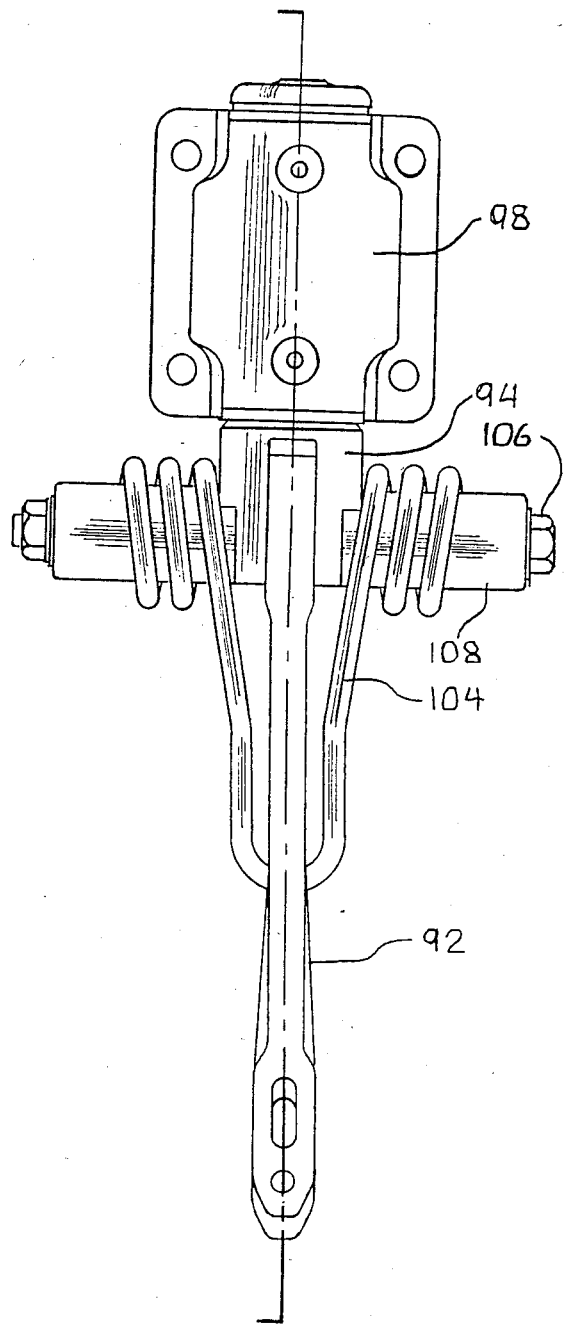
FIG. 9 is a front view of the cultivator sweep of FIG. 7.

As best seen in FIGS. 8 and 10, forward rotation of the cultivator shank 92 within the clevis 94 is prevented by contact of the top edge 102 of the cultivator shank against the crotch of the clevis 94. The top edge 102 and clevis co-act to form a stop for the forward motion of the cultivator shank 92. The cultivator shank 92 is loaded against that stop by the double torsion spring 104 that is supported by a horizontally extending bolt 106 that passes through both the cultivator shank 92 and the clevis 94. A spring mounting spool 108 is included between the double torsion spring 104 and the bolt 106.

Because of the action of the double torsion spring 104, considerable force is required to pivot the cultivator shank 92 rearwardly. Such a strong force is not normally encountered when cultivating soft soil, but if the cultivator sweep 90 should strike a large rock, the resulting force would cause the cultivator shank 92 to pivot rearwardly and upwardly so as to pass over the obstruction and without the risk that the cultivator shank 92 would be broken or bent.

As mentioned above, the cultivator shank and sweep are mounted by means of the shaft 96 for rotation about a vertical axis. It should also be noted, that the cultivator sweep lies entirely behind the vertical axis of the shaft 96. Accordingly, the cultivator sweep 90 is said to be castered, and it will immediately adapt the direction in which it is pointing to coincide with the instantaneous direction of motion through the ground. Thus, rotation about the vertical axis of the shaft 96 permits the cultivator sweeps to adapt to the various lateral motions produced by operation of the cultivator without at the same time subjecting the cultivator shank assembly to unacceptable lateral loads. Also, rotation about the vertical axis, when combined with the rearwardly pivoting action of the cultivator shank greatly enhances the ability of the cultivator shank to avoid damaging impact with large rocks or other immovable objects.

Figure 12:
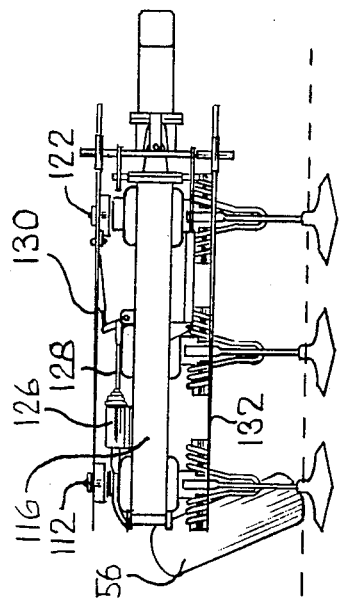
FIG. 12 is a front view of the outrigger of FIG. 11.
Figure 11:
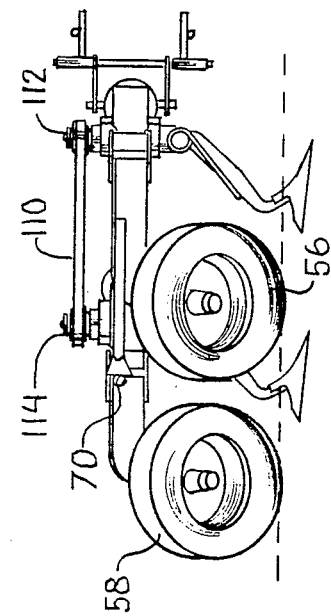
FIG. 11 is a side elevation view of the right outrigger of the cultivator of FIG. 1.

FIGS. 11 and 12 are a side elevation view and front elevation view, respectively, showing the right outrigger 10 of the preferred embodiment in greater detail. The ground level is shown as a dashed line, and the outrigger is shown in its fully extended position.

FIGS. 11 and 12 clearly show that the wheels 56, 58 are cambered. The spray nozzle 70 is also visible.

It should also be noted in FIG. 11 that the arm 110 is mounted to the arms 116, 118 by the ball joints 112, 114 respectively. Similarly, as may also be seen in FIG. 2, the arm 120 is mounted to the arms 116, 118 by the ball joints 122, 124 respectively.

Figure 14:
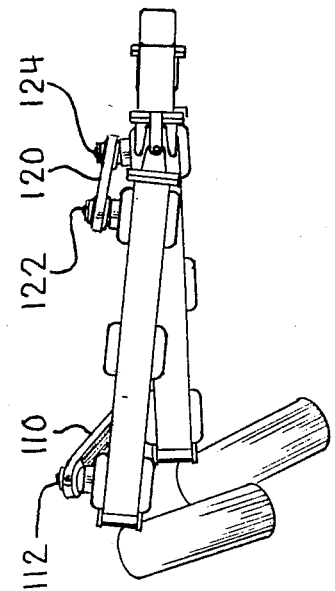
FIG. 14 is a front view of the outrigger of FIG. 13.
Figure 13:
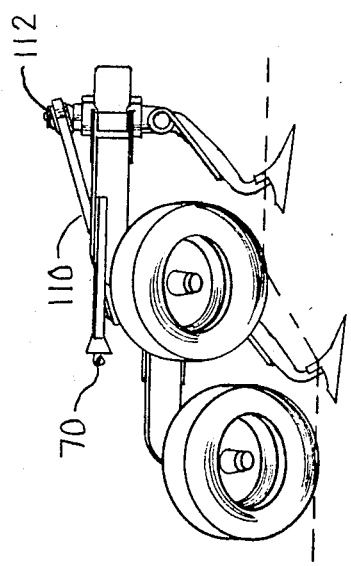
FIG. 13 is a side elevation view of the outrigger of FIG. 11 shown passing along inclined terrain.

The reason for mounting the arms 110 and 120 to the arms 116, 118 through the use of ball joints is illustrated in FIGS. 13 and 14. In FIG. 13, the outrigger 10 is seen to be climbing up a small step in the terrain. FIG. 14 is a front elevation view showing the outrigger in the same configuration as in FIG. 13. Here it can be seen that the arm 110 as well as the arm 120 must be free to accommodate to various angles out of the plane. In an alternative embodiment, the ball joints 112, 114, 122, 124 are replaced by universal joints.

Also visible in FIG. 12 and FIG. 15 are the sprayer pump 126 that is connected through the linkage 128 to the arm 120. The sprayer pump 126, in the preferred embodiment, is not maintained under a constant pressure, but instead is alternately filled and pressurized by the successive relative motions of the arm 120 with respect to the arm 116 as the outrigger executes its evasive maneuver. The sprayer thus actually sprays only as the outrigger starts to return to its extended position from whatever retracted position it attained during its evasive maneuver, and this permits the spraying system to lay down a spray pattern similar to the sprayed area 72 shown in FIG. 1 so that the spraying is confined to the vicinity of the plants and would therefore be called spot spraying. This type of spraying in limited areas is particularly desirable when herbicides are being sprayed, because spraying the entire orchard or vineyard with the herbicide would cause too rapid a buildup of the chemicals in the soil with the possible result that the soil would be rendered barren. Also visible in FIGS. 12 and 15 are the sensing arms 130, 132 used in a preferred embodiment. These sensing arms consist of a Fiberglas ® rod in the preferred embodiment so that they will be both resilient and strong.

The sensing arms 130, 132 are interconnected and are pivotally mounted to the arm 116 so as to pivot with the arm 116, as may be seen by comparing FIGS. 15 and 16, but are also pivoted to the arm 116 so as to be able to pivot slightly to respect to the arm 116. Thus, the sensing arm assembly is rigidly connected to the crank 134 that is pivotally mounted through the pin 136 to the arm 116.

When either of the sensing arms 130, 132 strikes an object 32 while the cultivator is in motion, the sensing arm is pushed rearwardly by the object, thereby causing the crank 134 to pivot about the pin 136 so that the arm 138 of the crank 134 is pressed against the microswitch 142, thereby electrically closing the microswitch 142. The microswitch 142 controls an electrically-actuated hydraulic valve that applies hydraulic fluid to the cylinder 66 in such a way as to cause the cylinder to contract in length, thereby drawing the outrigger rearwardly and inwardly toward the main frame.

FIGS. 15–20 are a sequence showing the retracting action of the outrigger at successive time intervals during its cycle of operation. The cycle starts when, as shown in FIG. 15, the sensing arm 130 contacts an object 32 such as a stake, a vine, or the trunk of a tree that lies in the path of the right outrigger 10. The sensing arm 130 is deflected rearwardly through contact with the object 32, thereby causing the crank 134 to rotate clockwise with respect to the arm 116, closing microswitch 142 that operates the solenoid hydraulic valve 144 of FIG. 22 that applies pressurized hydraulic fluid to the port 146 of FIG. 22 of the cylinder 66, thereby causing the cylinder 66 to contract, drawing with it the arm 110.

A second stage in the cycle of operation is shown in FIG. 16. In FIG. 16, the rearward motion of the outrigger reduces the pressure of the object 32 against the sensing arm 130. Motion of the arm 116 relative to the arm 120 is operating the linkage 128 that causes the herbicide pump 126 to be filled with herbicide.

The wheels 56, 58 are maintaining the depth of cultivation.

FIG. 17 is the third figure illustrating the cycle of operation, and shows the outrigger in its most contracted configuration. A comparison of FIG. 17 with FIG. 15 shows that the outrigger of the present invention does more than simply swing or move laterally, but instead, in contrast of outriggers of the prior art, the outrigger of the present invention actually changes its shape to a shape of much narrower width.

Because the hydraulic system has caused the outrigger to contract and pivot rearwardly, the object 32 is no longer deflecting the sensing arm 130 from its normal position, and accordingly, the arm 138 has returned to its neutral position so that neither the microswitch 142 nor the microswitch 140 is being actuated. Accordingly, the solenoid valve 144 is closed, and the cylinder 66 is no longer contracting.

As indicated by the distended condition of the bellows 148 of the herbicide pump 126, the herbicide pump has now been completely filled with herbicide preparatory actual spraying. The wheels 56 and 58, because they are caster mounted, are following the direction of travel. As best seen in FIG. 15, the axles 150, 152 on which the wheels 56, 58 turn are rigidly attached to the arms 154, 156 respectively which in turn are pivotably connected to the arms 158, 160 respectively by the pins 162, 164 respectively. The pins 162, 164 permit the wheels 56, 58 to pivot about the substantially vertical axis of the pins 162, 164 so that the wheels 56, 58 are castered mounted.

Figure 18:
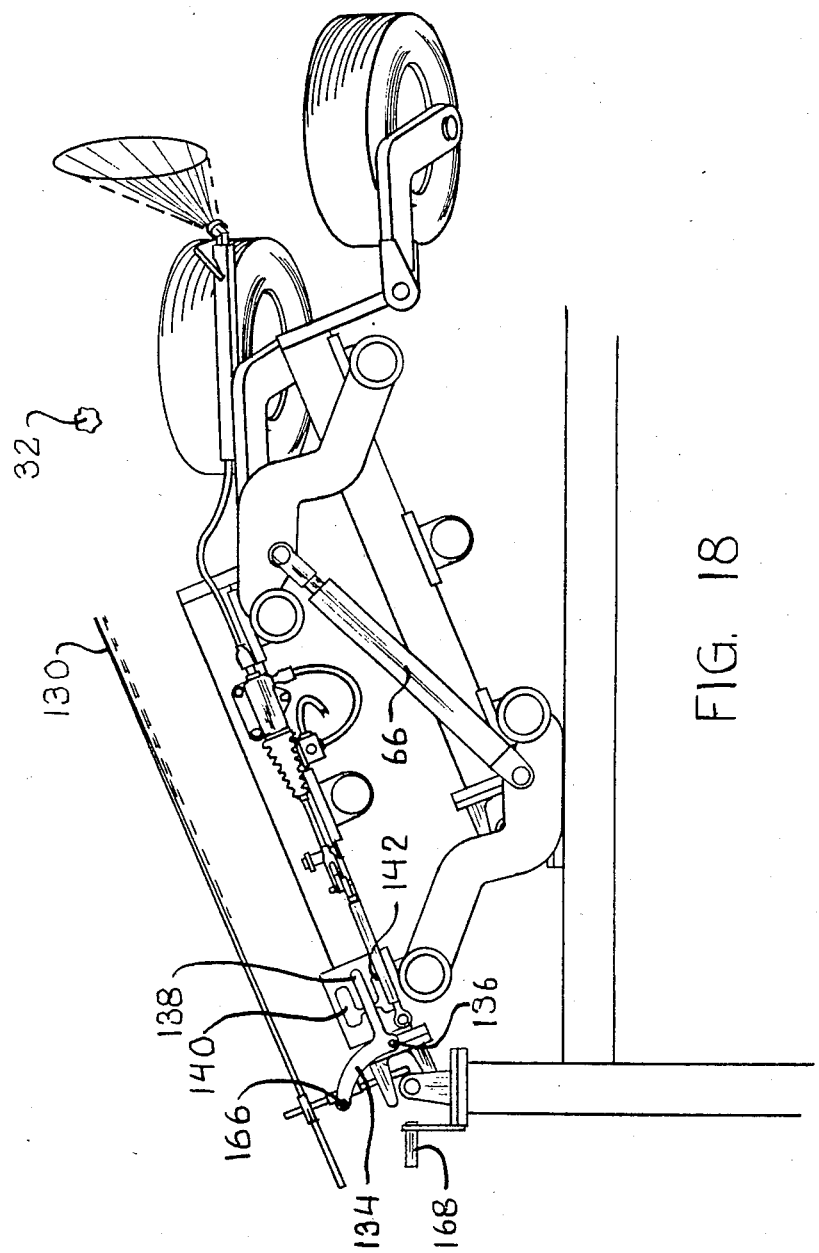
FIG. 18 shows the outrigger at a still later time from FIG. 17.
Figure 19:
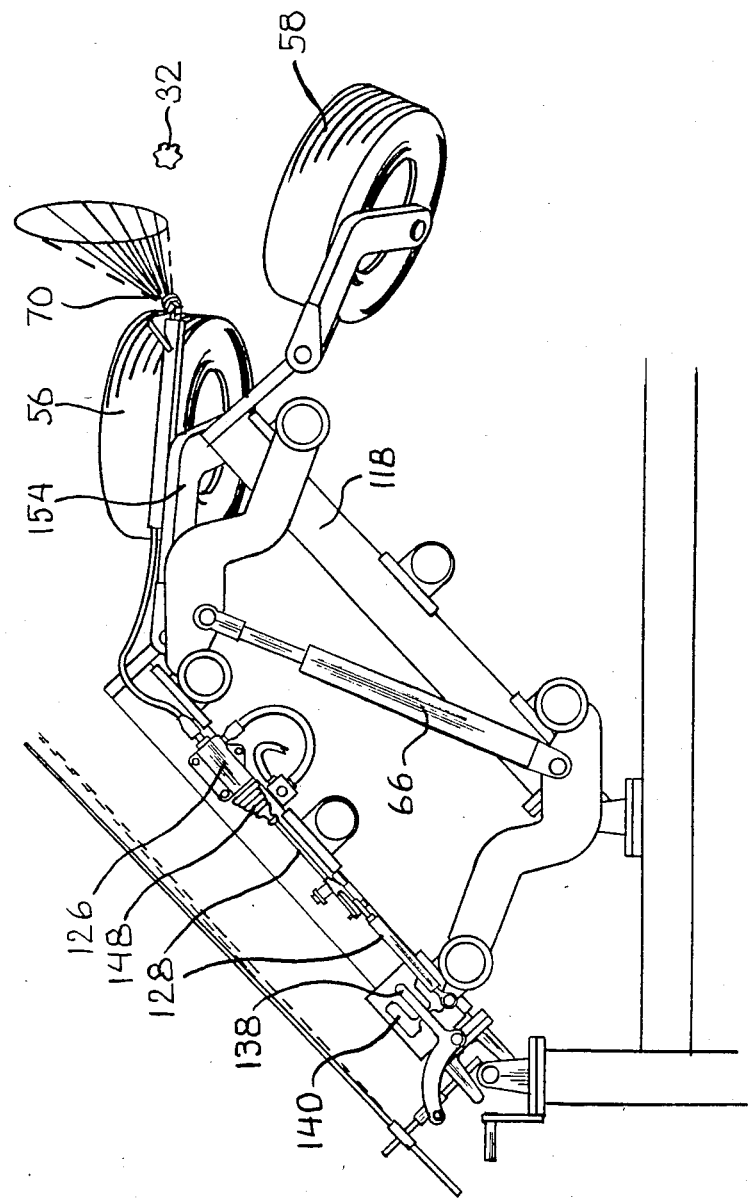
FIG. 19 shows the outrigger of FIG. 18 at a later time than in FIG. 18 and also shows the operation of the sprayer.

The caster-mounting of the wheels 56, 58 is most clearly seen by comparing the positions of the wheels in FIGS. 17, 18 and 19.

FIG. 18 is the fourth in a series showing the cycle of operation of the outrigger. In comparing FIG. 18 with FIG. 17, it is noted that the cultivator has moved forward so that the sensing arm 130 is no longer making contact with the object 32. When the outrigger is in its original position, a spring (not shown) connecting the crank 134 with the arm 116 biases the arm 166 of the crank 134 against the stop 168. In this position of the outrigger, the microswitch 140 cannot be activated because the stop 168 prevents the arm 166 of the crank from rotating in the counterclockwise direction.

In the configurations of FIGS. 16 and 17, the force of the object 32 against the sensing arm 130 easily overcomes the bias of the aforementioned spring, and causes the microswitch 142 to be actuated. However, in the configuration of FIG. 18, the object 32 is no longer pressing against the sensing arm 130. Further, because of the rotation of the arm 116, the arm 166 of the crank is not prevented from rotating counterclockwise by the stop 168. Therefore, the biasing spring rotates the crank 134 in a counterclockwise direction about the pin 136 and relative to the arm 116, thereby permitting the arm 138 of the crank 134 to actuate the microswitch 140.

Figure 22:
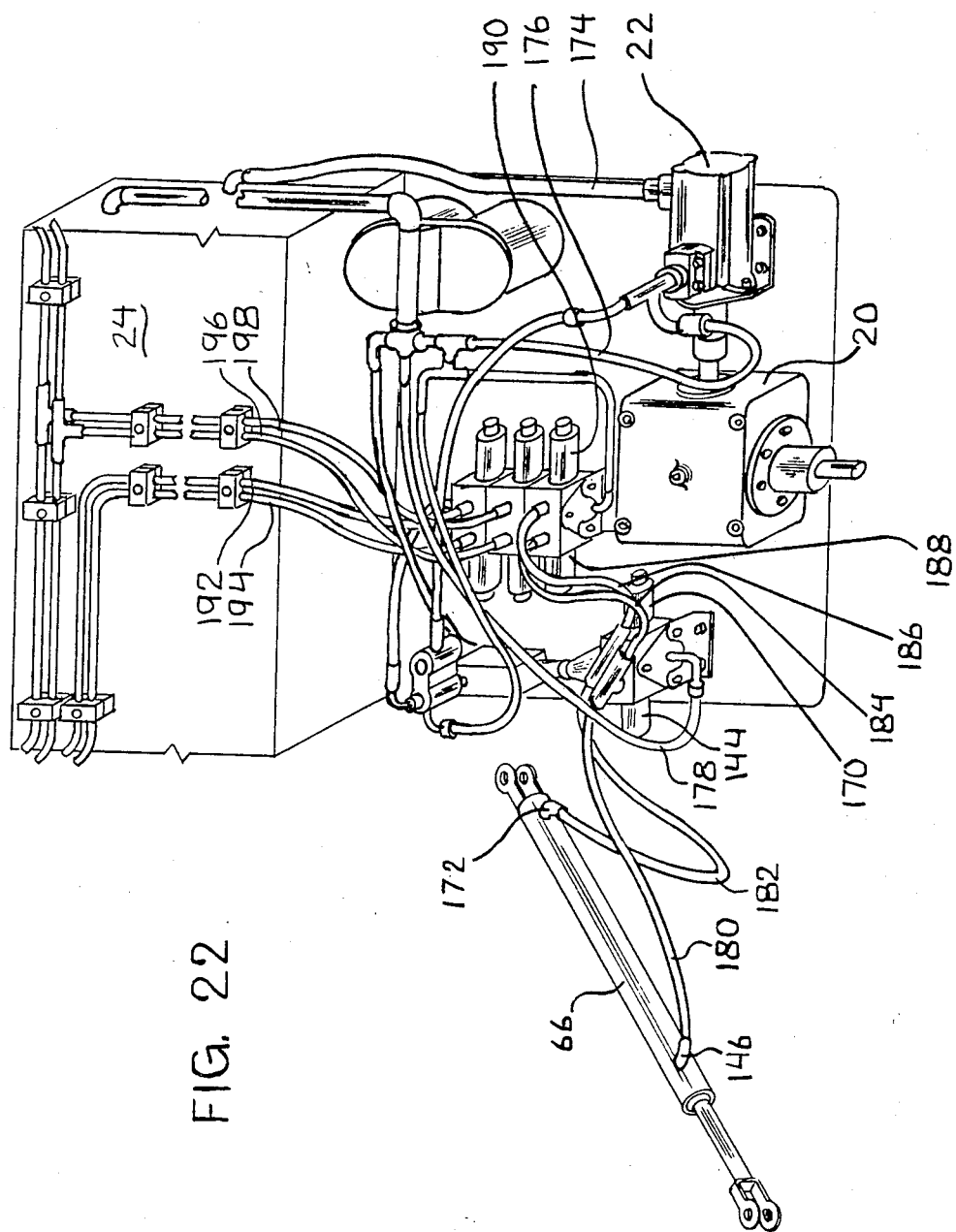
FIG. 22 is a perspective view showing the hydraulic system of the outrigger of FIG. 21; and, FIG. 23 is a front view similar to FIG. 6, but showing the outriggers raised for travelling.

Actuation of the microswitch 140 operates the solenoid valve 170 of FIG. 22 thereby permitting pressurized hydraulic fluid to be applied to the port 172 of the cylinder 66, so as to cause the cylinder 66 to extend its length. FIG. 18 shows the configuration of the outrigger a very short time after the pressurized hydraulic fluid has been applied to the port 172 of the cylinder 66 to initiate the return stroke by which the outrigger is brought back to its initial position shown in FIG. 15.

FIG. 19 shows the configuration of the outrigger at a slightly later time than in FIG. 18 during the return stroke. The linkage 128, which in FIGS. 16 and 17 was operating to extend the bellows 148 of the herbicide pump 126 so as to fill the pump with herbicide, is now operating to compress the bellows 148 so as to cause the herbicide to be sprayed through the nozzle 70. The direction and location of the nozzle 70 have been adjusted relative to the point in the cycle of operation at which the herbicide is ejected, to assure that the herbicide is distributed in a small area around the base of the object 32.

At the point in the cycle of operation shown in FIG. 19, the microswitch 140 is being held closed by the arm 138.

In the drawings of FIGS. 15–18, the axles 150, 152 of the wheels 56, 58 have been generally parallel to each other because the caster-mounting of the wheels permitted them to align themselves in the direction of motion.

However, as seen in FIG. 19, at some point in the return stroke, the outboard end of the arm 118 prevents the castering action of the wheel 56 due to contact between the arm 154 and the outboard end of the arm 118. As a result, the wheel 56 cannot align itself in the direction of the motion, as does the wheel 58, and therefore, the wheel 56 is partially skidding at this point in the return motion. However, skidding is greatly reduced by the camber of the wheel 56. The camber of the wheel 56 enables it to continue rolling during the skid, even while it is being forced sideways by the arm 118, thereby reducing wear of the wheel 56.

Figure 20:
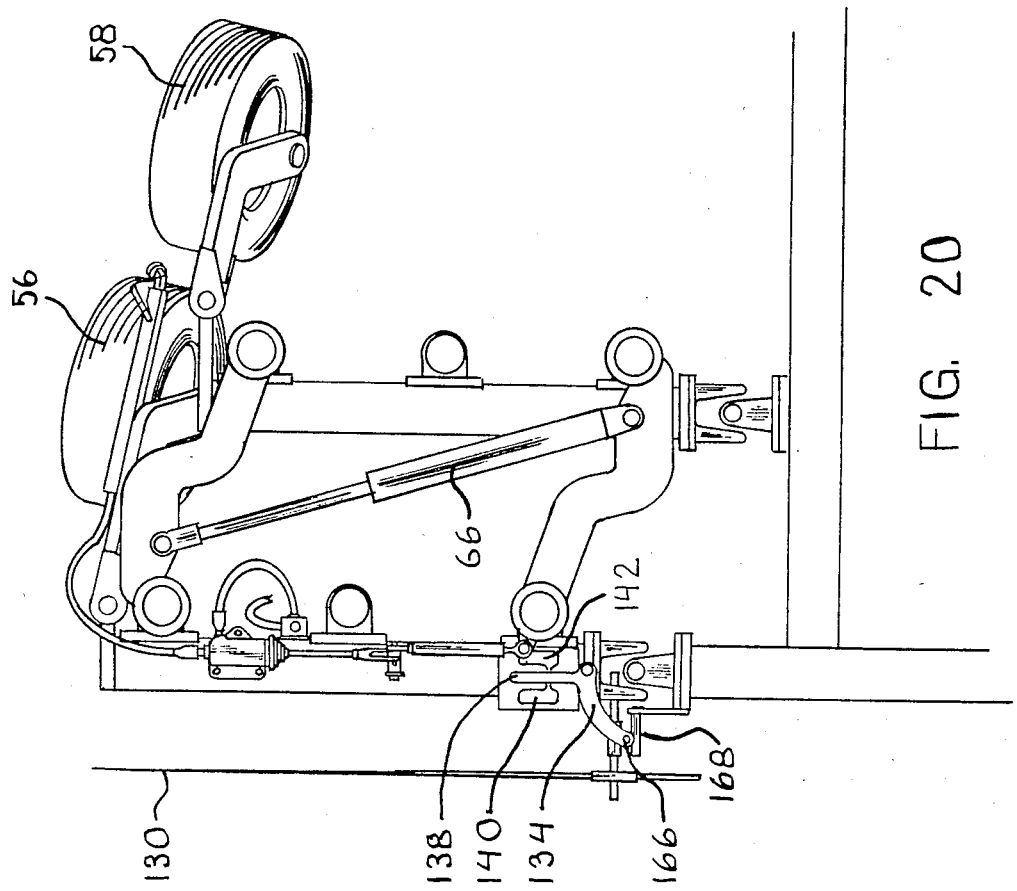
FIG. 20 is a top view of the outrigger of FIG. 19 and shows the outrigger of FIG. 19 near the completion of its cycle of operation.

FIG. 20 is the last of the figures in the sequence that illustrates the cycle of operation of the outrigger, and FIG. 20 shows the configuration just a short time before it returns to the initial condition shown in FIG. 15. As shown in FIG. 20, the arm 166 of the crank 134 has again contacted the stop 168, the force of the hydraulic cylinder 66 has easily overcome the counterclockwise bias of the biasing spring of the crank 134, thereby causing the arm 138 to move to a neutral position in which the microswitch 140 is no longer actuated. The microswitch 142 is not actuated either, because the next object in the row has not yet contacted the sensing arm 130. The wheels 56, 58 are returning to the position shown in FIG. 15.

Figure 21:
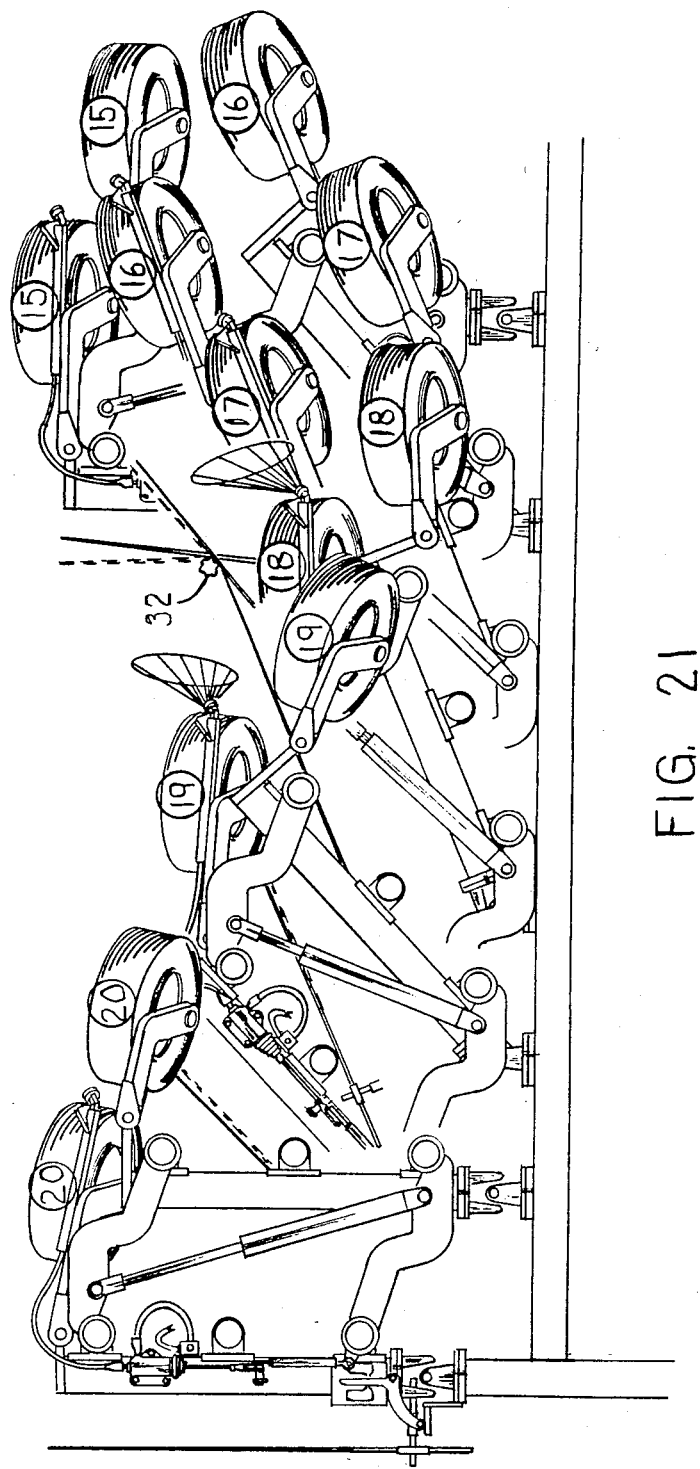
FIG. 21 is a composite top view formed by overlaying FIGS. 15-20 inclusive to show the action of the right outrigger of the cultivator of FIG. 1 in maneuvering around an object in its path.

FIG. 21 is a composite diagram consisting of a superposition of FIGS. 15-20 to give a better impression of the action of the outrigger. The numbers on the wheels identify the wheel positions corresponding to FIGS. 15-20.

FIG. 22 shows the hydraulic system for operating one of the outriggers. The gear box 20 is connected to the power take off of the tractor 14 and speeds up the rotation by a factor of two for the purpose of operating the hydraulic pump 22. The hydraulic pump 22 draws hydraulic fluid from the hydraulic oil reservoir 24 through the hydraulic line 174. The hydraulic pump 22 supplies pressurized hydraulic fluid through the line 176 and the line 178 to the solenoid operated valves 144, 170. Depending on which of the solenoid valves 144, 170 is actuated, the pressurized hydraulic fluid may be applied to the ports 146, 172 of the cylinder 66 through the lines 180, 182. The lines 184, 186 may also be used to supply fluid to the ports 146, 172 through the manually controlled electrically operated valves 188, 190 so that the operator can retract the outrigger from his position on the tractor even when no object is contacting the sensing arm 130.

Figure 23:
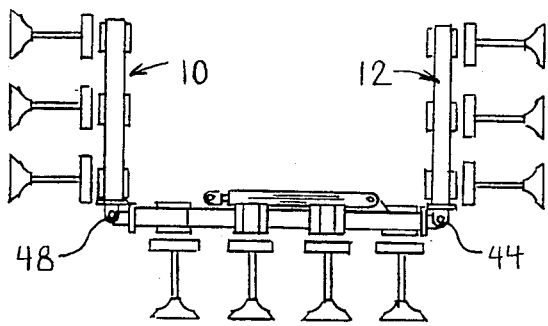
Figure 7:
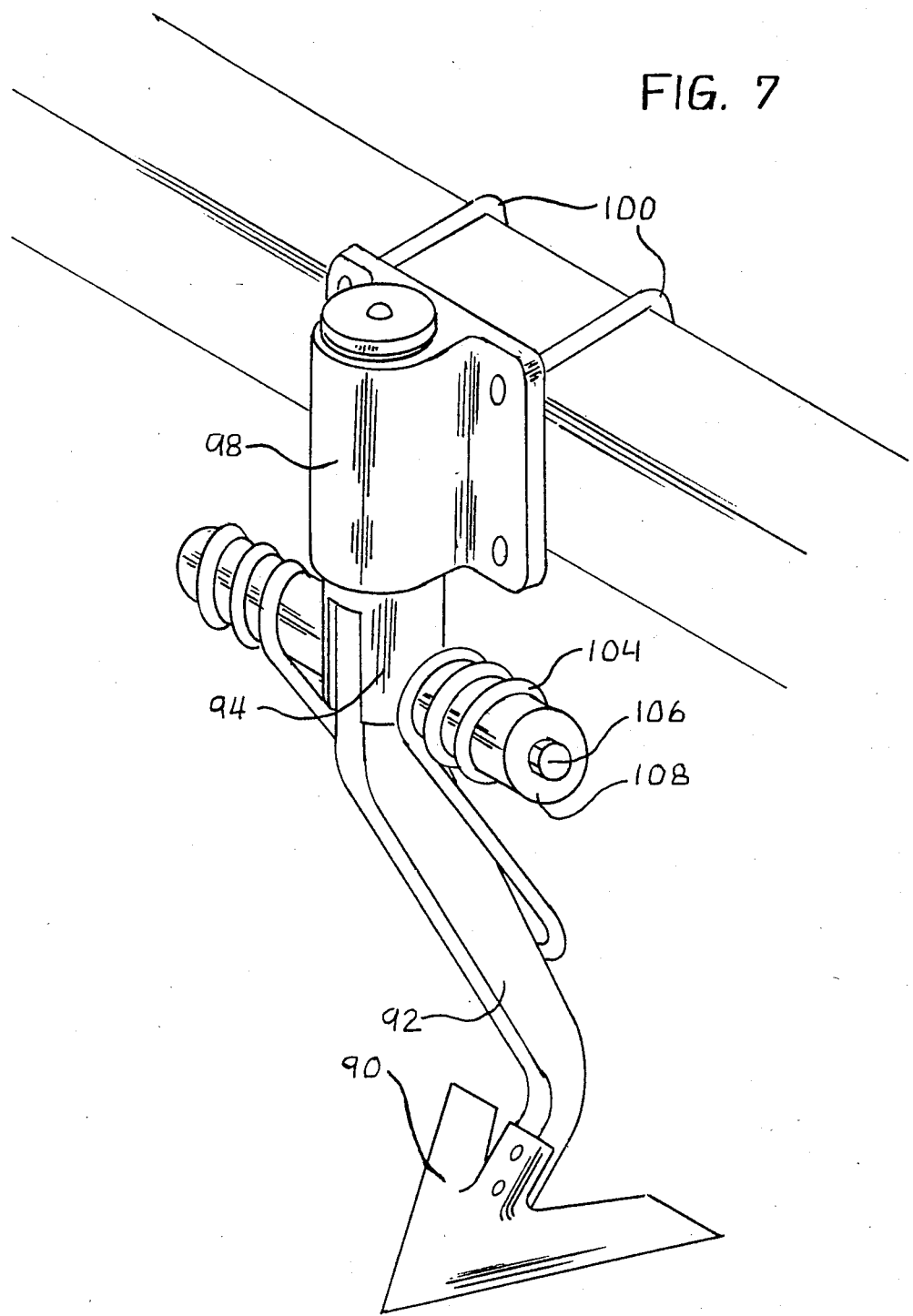
FIG. 7 is a perspective view of a caster spring-loaded cultivating sweep used in the present invention.

The hydraulic lines 192, 194 carry pressurized hydraulic fluid to hydraulic cylinders that are used for pivoting the outriggers upwardly for ease of transportation as shown in FIG. 23.

The flow of hydraulic fluid in the lines 192, 194 is controlled by the operator through solenoid valves shown in FIG. 22. The hydraulic lines 196, 198 supply hydraulic fluid to the hydraulic cylinders 40 that are used for raising and lowering the main frame relative to the wheels 34, 36, for transportation. The flow of hydraulic fluid in the lines 196, 198 is also controlled by the operator from the tractor through the use of solenoid valves.

Thus, there has been described a novel cultivator particularly well adapted for cultivating vineyards and orchards because it can cultivate the soil between successive trees or vines in the same row while traveling along the row. The cultivator includes an expandable main frame that the operator can expand or contract in relation to the space between the rows of plants. The main frame is flanked by outriggers that automatically contract inward toward the main frame to avoid hitting an object in their path such as a tree or vine. Each outrigger includes a sensing arm that is contacted by an object in the path of the outrigger.

Movement of the sensing arm actuates a microswitch, which in turn operates a solenoid valve that controls the flow of pressurized hydraulic fluid to a hydraulic cylinder that produces the retracting motion of the outrigger.

Each of the outriggers also includes a spot sprayer that is actuated by the retracting motion of the outrigger and that produces a localized spray pattern on the ground in the vicinity of the foot of the tree or vine. When spraying is done by this means, the amount of herbicide laid down on the ground is minimized.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A cultivator of the type that is controlled by an operator and that is particularly well adapted for cultivating a vineyard or an orchard wherein vines, trees, or other objects are spaced along generally parallel rows, said cultivator characterized in that its width can be adjusted continuously by the operator while the cultivator is in use, so as to accommodate variations in the space between two rows, and further characterized in that it cultivates a strip that is as wide or wider than the space between two rows without running over the vines, trees or other objects, said cultivator comprising in combination:

a main frame including a laterally-movable portion on which laterally-spaced castered sweeps are mounted and a laterally-unmovable portion on which laterally-spaced sweeps are mounted;

actuator means mounted on said main frame and operable under control of the operator for continuously adjusting while the cultivator is in use the lateral position of the laterally-movable portion with respect to the laterally-unmovable portion; and, an outrigger pivotally attached to the main frame for movement about a vertical axis and about a horizontal axis and having an outboard end that is supported and maintained at a substantially constant distance from the ground by a wheel to enable the outboard end of said outrigger to follow the contour of the ground, said outrigger further including sensing means and motive means that function without intervention by the operator for respectively sensing the presence of an object in the path of said outrigger and for contracting said outrigger laterally and pivoting said outrigger rearwardly toward the main frame to prevent said outrigger from running over the object.

2. The cultivator of claim 1 further comprising electrical means for producing under control of the operator electrical control signals and for transmitting the electrical control signals to said actuator means.

3. The cultivator of claim 1 wherein said wheel is cambered.

4. The cultivator of claim 1 wherein said outrigger further comprises four members that are pivotally connected to form a four-sided outrigger frame which is alterable in shape to permit lateral contraction of said outrigger frame.

5. The cultivator of claim 4 wherein said motive means interconnect any two of the four members of said outrigger frame for producing lateral contraction of said outrigger and for pivoting said outrigger rearwardly toward the main frame.

6. The cultivator of claim 4 wherein said four members are pivotally connected by ball joints.

7. The cultivator of claim 4 wherein said four members are pivotally connected by universal joints.

8. The cultivator of claim 1 further comprising pivotal means for connecting said outrigger to the main frame.

9. The cultivator of claim 8 wherein said pivotal means further comprise a ball joint.

10. The cultivator of claim 8 wherein said pivotal means further comprise a universal joint.

11. A cultivator of the type that has a main frame, that is controlled by an operator, and that is particularly well adapted for cultivating a vineyard or an orchard where vines, trees, or other objects are spaced along generally parallel rows, said cultivator characterized in that its width can be adjusted continuously by the operator while the cultivator is in use so as to accommodate variations in the space between two rows, in that it cultivates a strip that is as wide or wider than the space between two rows without running over the vines, trees or other objects, in that it can cultivate the soil between the successive vines or trees in a row without injuring the vines or trees, and further characterized in that without intervention by the operator it can spray a chemical in a limited area about the foot of each vine, tree or object and nowhere else, said cultivator comprising in combination:

a main frame including a laterally-movable portion on which laterally-spaced castered sweeps are mounted and a laterally-unmovable portion on which laterally-spaced sweeps are mounted;

actuator means mounted on said main frame and operable under control of the operator for continuously adjusting while the cultivator is in use the lateral position of the laterally-movable portion with respect to the laterally-unmovable portion;

an outrigger pivotally attached to the main frame for movement about a vertical axis and about a horizontal axis and having an outboard end that is supported and maintained at a substantially constant distance from the ground by a wheel to enable the outboard end of said outrigger to follow the contour of the ground, said outrigger further including sensing means and actuating means that function without intervention by the operator for respectively sensing the presence of an object in the path of said outrigger and for contracting said outrigger laterally and pivoting said outrigger rearwardly toward the main frame thereby causing the outboard end of said outrigger to jog laterally from its forward motion to prevent said outrigger from running over the object; and, sprayer means mounted on the outrigger near its outboard end and activated by the lateral jogging motion of the outrigger for directing a spray toward the foot of the object, said sprayer means by virtue of its location on the outrigger producing a sprayed area that extends around the foot of the object and nowhere else.

12. The cultivator of claim 11 further comprising electrical means for producing under control of the operator electrical control signals and for transmitting the electrical control signals to said actuator means.

13. The cultivator of claim 11 wherein said wheel is cambered.

14. The cultivator of claim 11 wherein said outrigger further comprises four members that are pivotally connected to form a quadrilateral-shaped outrigger frame which is alterable in shape to permit lateral contraction of said outrigger frame.

15. The cultivator of claim 14 wherein said four members are pivotally connected by ball joints.

16. The cultivator of claim 14 wherein said four members are pivotally connected by universal joints.

17. The cultivator of claim 14 wherein said outrigger further comprises motive means interconnecting any two of the four members of said outrigger frame for producing lateral contraction of said outrigger and for pivoting said outrigger rearwardly toward the main frame.

18. The cultivator of claim 11 further comprising pivotal means for connecting said outrigger to the main frame.

19. The cultivator of claim 18 wherein said pivotal means further comprise a universal joint.

20. The cultivator of claim 18 wherein said pivotal means further comprise a ball joint.

21. The cultivator of claim 11 wherein said outrigger further comprises caster-mounted sweeps.

22. The cultivator of claim 11 wherein the outrigger includes outrigger frame members that move in a first direction relative to one another as the outrigger contracts and that move in a second direction relative to one another as the outrigger reverts to its original uncontracted configuration and wherein said sprayer further includes pump means connected between two of the outrigger frame members and operated by relative motion between the two outrigger frame members to fill the pump during motion in said first direction and to discharge the pump during motion in said second direction.

23. The cultivator of claim 22 wherein said sprayer further includes a reservoir and check valve means connected between said reservoir and said pump means to permit a liquid contained in said reservoir to enter said pump means during motion in said first direction but to prevent the liquid from returning to said reservoir during motion in said second direction.

* * * * *